United States Patent [19]
Chen et al.

[11] Patent Number: 6,163,788
[45] Date of Patent: Dec. 19, 2000

[54] PROGRAMMABLE FINITE IMPULSE RESPONSE PROCESSOR WITH SCALABLE DYNAMIC DATA RANGE

[75] Inventors: Oscal T.-C. Chen; Jeng-Yih Wang, both of Hsinchu, Taiwan

[73] Assignee: Industrial Technology Research Institute, Hsinchu, Taiwan

[21] Appl. No.: 09/104,341

[22] Filed: Jun. 25, 1998

[51] Int. Cl.[7] .................................................. G06F 17/10
[52] U.S. Cl. ............................................................ 708/319
[58] Field of Search ...................................... 708/319, 322, 708/628–632

[56] References Cited

U.S. PATENT DOCUMENTS

| | | | |
|---|---|---|---|
| 5,193,070 | 3/1993 | Abiko et al. | 708/319 |
| 5,333,119 | 7/1994 | Raatz et al. | 708/630 |
| 5,777,914 | 7/1998 | Larsson et al. | 708/322 |
| 6,009,448 | 12/1999 | Jong et al. | 708/322 |

*Primary Examiner*—Tan V. Mai
*Attorney, Agent, or Firm*—Knobbe, Martens, Olson & Bear, LLP

[57] ABSTRACT

A programmable finite impulse response processor, by which a convolution calculation between input data and filter coefficients is performed based on Booth algorithm. The processor include a pre-processing unit, data latches, a configurable connection unit, Booth decoders, coefficient registers, a path control unit, and a post-processing unit. The pre-processing unit is used to partition the input data into a pipeline sequence which include a plurality of sequence units in a Booth format. According to both the dynamic ranges of the input data and of the filter coefficients, the configurable connection unit is used to select certain parts of the sequence units for the convolution calculation, so that a dynamic data range is scaleable by the processor. By Booth decoders, the selected sequence units are decoded and multiplied by corresponding filter coefficients stored in the coefficient registers. By the path control unit, the bit lengths of the filter coefficients are scaled and accumulation pathes are selected. The post-processing unit is to perform a final accumulation of the convolution calculation results between the selected sequence units and the filter coefficients.

4 Claims, 10 Drawing Sheets

PROGRAMMABLE FINITE IMPULSE RESPONSE PROCESSOR WITH SCALABLE DYNAMIC DATA RANGE

BACKGROUND OF THE INVENTION

1. Field of the Invention

The invention relates in general to a finite impulse response (FIR) processor, and more particularly, based on Booth algorithm, to a programmable finite impulse response with a scalable dynamic data range.

2. Description of the Related Art

Filters of finite impulse response applied in a real-world applications have many advantages such as easy implementation, noise immunity, sharp cut-off frequencies, high stability and so on. The major operation of a FIR filter is the convolution realized by using adders, multipliers, and delay elements. However, a multiplier takes a lot of computation time to perform its function. In order to reduce the complexities, high-speed FIR filters without using multipliers have been proposed by many researchers. These multiplierless filters can be classified into a memory based approach, a canonical signed-digit (CSD) approach, and a Booth-algorithm approach.

The simplified FIR design in the above three approaches allows easy incorporation of programmability. However, scaleable dynamic ranges of input data and filter coefficients are not straightforwardly achievable. In the memory-based FIR design. the word length of input data and precision of filter coefficients are usually fixed for one memory configuration. In order to achieve scaleability, the memory cells have to be reconfigured and the connections between taps have to be rearranged. Due to a high cost of the original architecture for a large dynamic data range, the memory based FIR may not be a good candidate for scaleable design. In the CSD FIR design, filter coefficients are easily scaleable but functional units in each tap require the maximum word-length design. All CSD taps are directly addressed by every input datum using the fixed word-length hardware. When considering a large dynamic range of input data, the input data has to be partitioned into a sub-datum sequence. Hence, there is a need of the complicated tap design to support the FIR computing based on this sub-datum sequence. The scaleable CSD FIR cannot be realized at a low cost.

By employing Booth-algorithm, bit-level input data can be easily scaled for different dynamic ranges, and precision of filter coefficients can be scaleable due to the regular structure of each FIR filter tap.

A tap of a conventional FIR processor is shown as FIG. 1. The tap comprises a coefficient latch, a Booth decoder, an adder, a 2-to-1 multiplexor (MUX), and an accumulation latch. As shown in the figure, the FIR does not comprise a means for the application of Booth algorithm to scale a datum with dynamic ranges. Without configuring a connection between the input data and the filter coefficients, the function of the FIR is not flexible enough to process data with dynamic ranges.

SUMMARY OF THE INVENTION

It is therefore an object of the invention to provide a programmable FIR processor with scaleable dynamic data ranges based on Booth algorithm. This FIR processor provides a highly flexible way to manipulate input data and filter coefficients. Data-path controls are employed to accomplish the scaleable issue. The FIR processor comprises a pre-processing unit for manipulating input data and a post-processing unit for computing accumulation results. The pre- and post-processing units are designed to support scaleable operation.

To achieve these objects and advantages, and in accordance with the purpose of the invention, as embodied and broadly described herein, the invention is directed towards a programmable finite impulse response processor, by which a convolution calculation between input data and filter coefficients is performed based on Booth algorithm. The processor comprises a pre-processing unit, data latches, a configurable connection unit, Booth decoders, coefficient registers, a path control unit, and a post-processing unit. The pre-processing unit is used to partition input data into a pipeline sequence which comprises a plurality of sequence units in a Booth format, and which is stored in data latches. According to both the dynamic ranges of the input data and of filter coefficients, the configurable connection unit is used to select certain parts of the sequence units for the convolution calculation, so that a dynamic data range is scaleable by the processor. By Booth decoders, the selected sequence units are decoded and multiplied by the corresponding filter coefficients stored in the coefficient registers. By the path control unit, the bit lengths of the filter coefficients are scaled and accumulation pathes are selected. The post-processing unit is to perform a final accumulation of the convolution calculation results between the selected sequence units and the filter coefficients.

It is to be understood that both the foregoing general description and the following detailed description are exemplary and explanatory only and are not restrictive of the invention, as claimed.

DESCRIPTION OF THE PREFERRED EMBODIMENTS

A major calculation for a FIR is the convolution between input data and filter coefficients. In a preferred embodiment according to the invention, the radix-4 Booth algorithm is used for the convolution calculation by a FIR filter with input data of X and filter coefficients of C. Each datum of $X_i$ is partitioned into many 3-bit groups or triplets, each of which has one bit overlapped with the previous group. This triplet can be written as:

$$X_{i,l} = \{x_i^{2l+1}, x_i^{2l}, x_i^{2l-1}\} \quad (1)$$

where $l=0, 1, \ldots, W/2-1$. $x_i^j$ is the $j_{th}$ digit of $X_i$ and $x_i^{-1}=0$. $X_i^{2l-1}$ is overlapped with the previous triplet of $X_{i,l-1}$ such that the 2's complement of Xi can be represented by:

$$X_i = -x_i^{W-1} \times 2^{w-1} + \sum_{j=0}^{W-2} x_i^j \times 2^j \quad (2)$$

$$= \sum_{l=0}^{W/2-1} (-2x_i^{2l+1} + x_i^{2l} + x_i^{2l-1}) \times 2^{2l}$$

For $C_j$ multiplied by $X_i$, the equation (2) is modified as:

$$C_1 \times X_1 = \sum_{l=0}^{W/2-1} (-2x_i^{2l+1} + x_i^{2l} + x_i^{2l-1}) \times C_j \times 2^{2l} \quad (3)$$

$$= \sum_{l=0}^{W/2-1} B(X_{i,l}, C_j) \times 2^{2l}$$

According to equation (3), $B(X_{i,j}, C_j)$ is the intermediate product which is represented by 5 different values:

$$B(X_{i,1}, C_j) = \begin{cases} 0 & \text{if } X_{i,1} = \{0,0,0\}, \{1,1,1\} \\ C_j & \text{if } X_{i,1} = \{0,1,0\}, (0,0,1) \\ -C_j & \text{if } X_{i,1} = \{1,1,0\}, \{1,0,1\} \\ 2C_j & \text{if } X_{i,1} = \{0,1,1\} \\ -2C_j & \text{if } X_{i,1} = \{1,0,0\} \end{cases} \quad (4)$$

From equation (3) and (4), it is known that convolution between the input data and filter coefficients requires W/2 summations based on the intermediate products of $-2C_j$, $-C_j$, 0, $C_j$, and $2C_j$. Hence, the complexity of decoding function in the radix-4 approach is very low.

FIR Architecture The VLSI implementation plays a key role in developing high-speed, low-cost, light-weight, and low-power applications. Based on pipeline, parallel, or programmable schemes, various FIR architectures have been proposed by many researchers to pursue high-throughput and cost effective designs. The main challenge would be to optimize flexible architecture for various FIR applications at a low cost.

Figure 1:
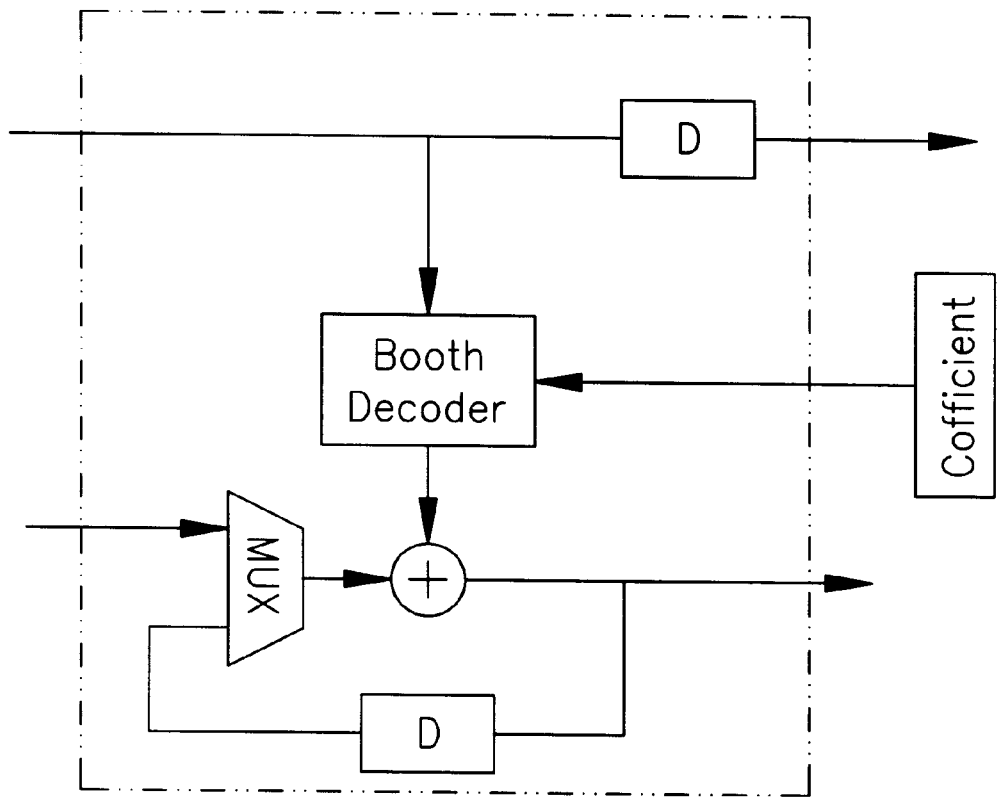
FIG. 1 shows the structure of a FIR based on the Booth algorithm.

One of a conventional N-tap FIR with output data of Y is illustrated in FIG. 1. The relationship between input data and output data are described as follows, $$Y_n = \sum_{i=0}^{N-1} C_i \times X_{n-i} \quad (5)$$

The multiplication between $X_{n-i}$ and $C_i$ is accomplished by the radix-4 algorithm.

$$Y_n = \sum_{i=0}^{N-1} C_i \times X_{n-i} \quad (6)$$

$$= \sum_{l=0}^{N-1} \left[ \sum_{l=0}^{W/2-1} B(X_{n-i,1}, C_i) \times 2^{2l} \right]$$

According the above equation, to construct the FIR architecture, accumulations in each tap to sum up intermediate products are required.

By rearranging the equation (6), a relationship is obtained:

$$Y_n = \sum_{l=0}^{W/2-1} \left[ \sum_{i=0}^{N-1} B(X_{n-i,1}, C_i) \right] \times 2^{2l} \quad (7)$$

Figure 2:
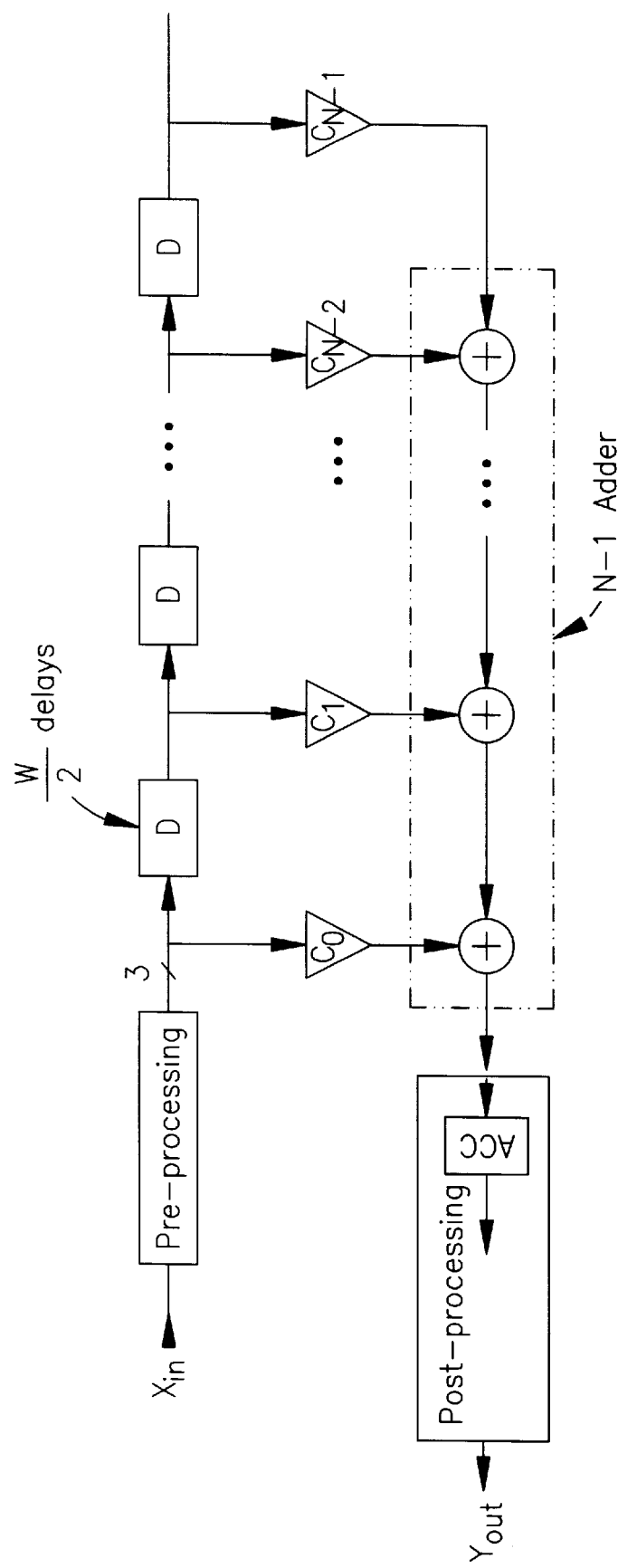
FIG. 2 shows a modified FIR architecture.

Based on the rearranged relationship above, a modified FIR architecture is shown in FIG. 2. The accumulation in each tap is moved to a post-processing unit such that the word length and hardware components to each tap are optimized. In order to achieve scaleable dynamic ranges of input data and filter coefficients, the above equation is further modified as:

$$Y_n = \sum_{l=0}^{W/2-1} \sum_{j=0}^{s} \left[ \sum_{i=0}^{N-1} B(x_{n-i,1}, c_{i,j}) \times 2^{2l} \right] \times 2^{-(j \times k-1)} \quad (8)$$

wherein $C_{i,j}$ is the $j^{th}$ sub-precision component of $C_i$, S is the number of sub-coefficients, and k represents the bit number of the partial filter coefficient. According to the equation, scaleability can be realized in the control of W and S. Since input data are recorded in the radix-format, scaleable data ranges can be pursued by configuring the connections between data latches and filter taps. In such a design, various dynamic ranges can be achieved when a pre-processing provides a correct triplet sequence and the post-processing unit provides an enough data bandwidth for accumulation of intermediate results. On the other hand, precision of filter coefficients can be scaled by configuring the connections among taps while the post-processing unit can sum the sub-precision values to yield a correct result.

Hardware Implementation

It is known that in the current technique of FIR processor, the scaleable range is restricted in either filter coefficients or bit length of the input data. A programmable FIR processor with scaleability in both filter coefficients and bit length (word length) of the input data has not been seen. In the invention, using Booth algorithm to accomplish the multiplication, by implementing a pre-processing unit, data latches, a configurable connection unit, Booth decoders, coefficient registers, a path control unit, and a post-processing unit, a programmable FIR processor with scaleable dynamic data ranges is obtained as shown in FIG. 3.

Figure 3:
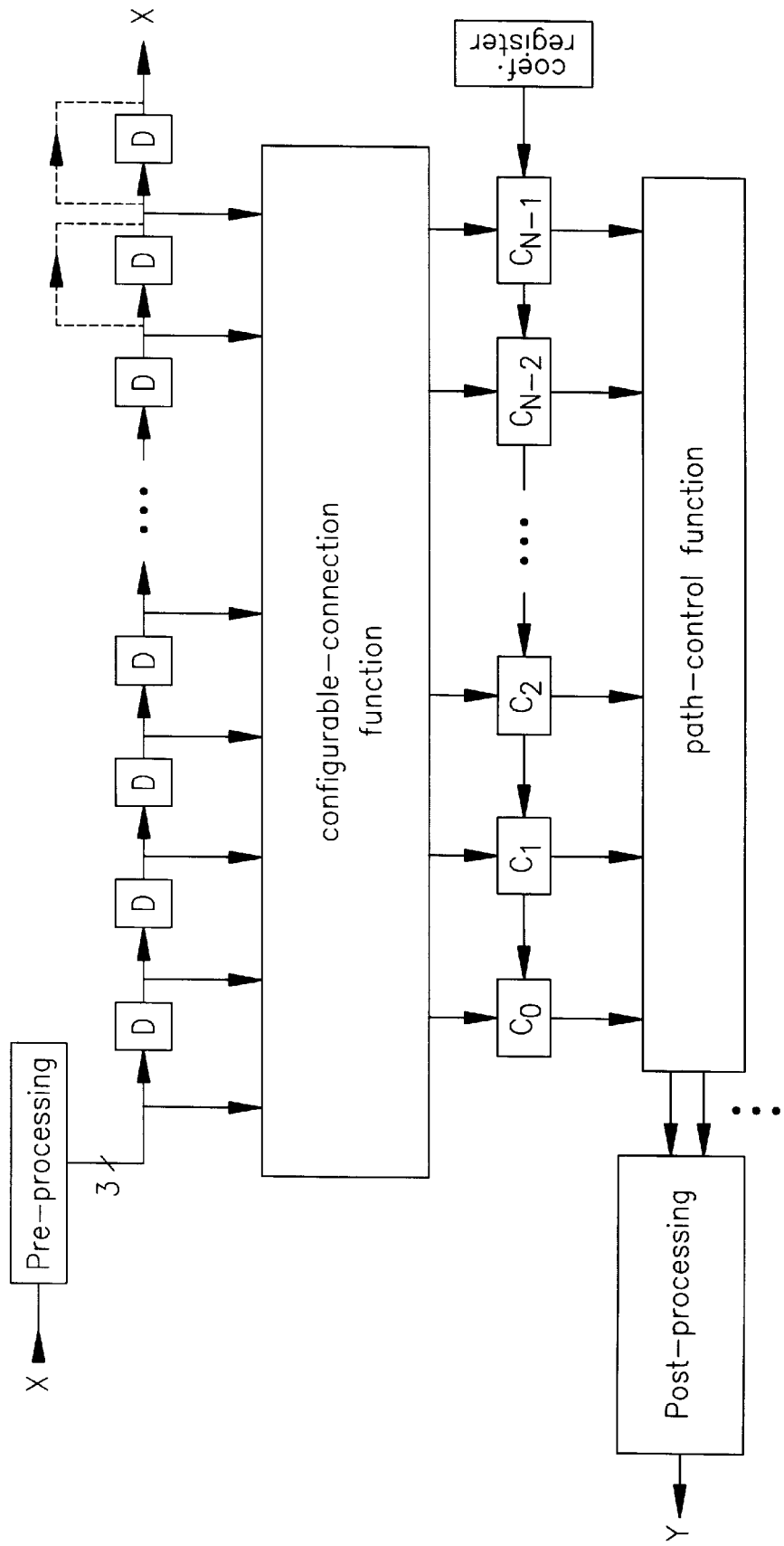
FIG. 3 shows a programmable FIR processor with scaleable dynamic data ranges.
Figure 4:
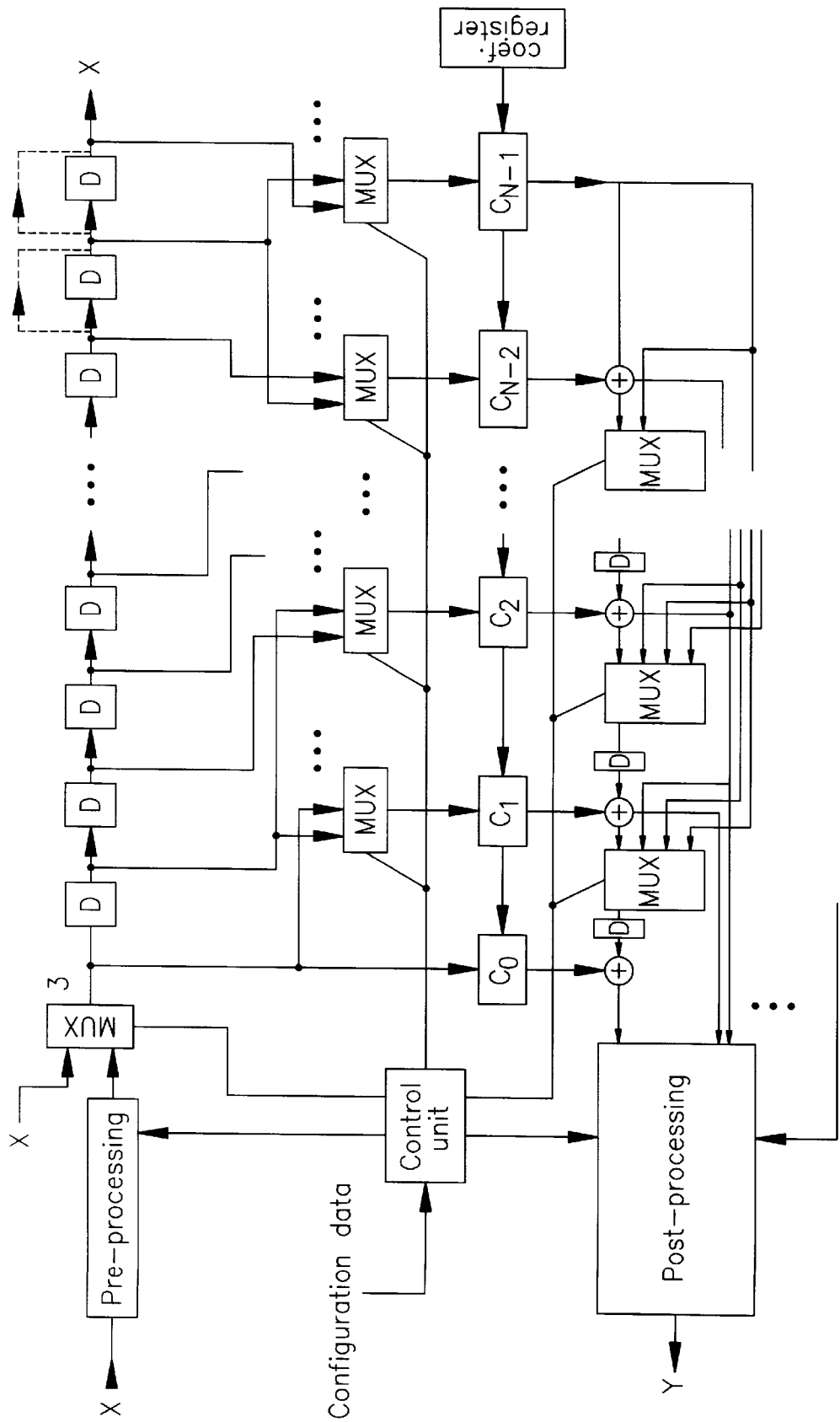
FIG. 4 shows the design of the configurable connection and the path-control functions of the FIR processor shown in FIG. 3.

In the implementation of the scaleable FIR as shown in FIG. 3, it is very important to realize the configurable connections efficiently and effectively. For designing scaleable dynamic ranges of input data, simple multiplexors or other hardware can be utilized to configure the connection topology as shown in FIG. 4. The paths of each filter tap connected to several data latches are controlled by a multiplexor for different scaleable ranges. Only one path is enabled to link a filter tap to the corresponding latch of input data. The control unit interprets scaleable ranges and generates control signals for multiplexor to determine the correct path.

A detailed description of each unit of the programmable FIR processor with scaleable dynamic data ranges is as follows.

Pre-processing Unit

Figure 5:
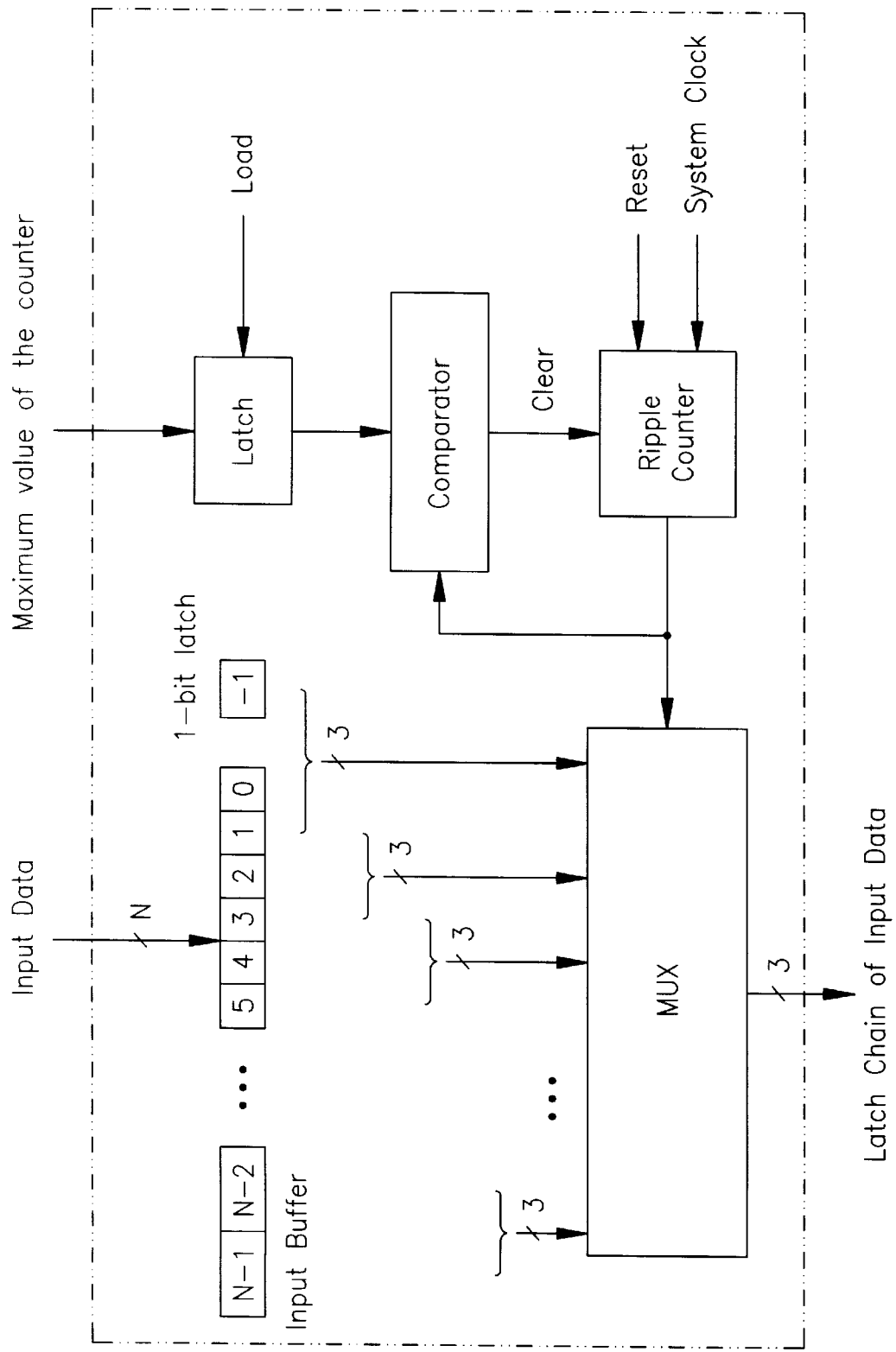
FIG. 5 shows the pre-processing unit of the FIR processor shown in FIG. 3.

The pre-processing unit for manipulating input data and generating output results is designed to support a scaleable FIR computing. As shown in the FIG. 5, in a preferred embodiment according to the invention, the pre-processing unit comprises an input buffer, a data latch, a comparator, a ripple counter, and a multiplexor. The input buffer is used to store various dynamic ranges of input data. The data latch records the maximum value of a counter for the currently-used dynamic data range. The comparator is to compare the output value of the counter with the output value of the data latch. When these two values are the same, the counter is cleared to zero. The ripple counter is utilized to generate the control signals for the multiplexor to select the three-bit data in a correct sequence.

Considering the case of radix-4 algorithm, when a signal is input to the pre-processing unit, the input signal is partitioned into a pipeline sequence of many three-bit groups. The last bit of a group and the first bit of the next group are overlapped. The overlapped bit in the first group of the sequence is called the initial bit. Normally, an initial value given by the pre-processing unit is zero. In FIG. 3, the bit number of the input register of the pre-processing unit is N, so that an input sequence of N/2 data groups is output from low bit to high bit sequentially. The group to be output is selected by the bit selector, the counter, and some other control signals. If the bit length L of the input signal processed by the pre-processing unit is larger than the bit number N of the register, the signal is partitioned into several N-bit strings. The initial bit of the input string has to be given according to the actual condition.

Data latches

As shown in FIG. 3, being processed by the pre-processor unit, input data, in the above example are partitioned into a pipeline sequence of many 3-bit groups. These groups are then stored in pipelined data latches.

Configurable-Connection Unit

The configurable-connection unit is disposed between the data latches and Booth decoders (FIR taps). The main function of the configurable connection unit is to connect these two units correctly according to both the bit lengths of the pipeline sequence and of filter coefficients. Considering the radix-4 Booth algorithm, the pipeline sequence comprises several three-bit groups. Being processed by the pre-processing unit, each input datum with a bit number of L is partitioned into L/2 input data groups stored in the data latches. Therefore, L/2−1 pipeline units for each filter tap are required for pipeline structure treatment to accelerate the FIR operation. The output of the (L/2−1)$^{th}$ pipeline unit is connected to the next delay unit and a Booth decoder. Since the dynamic range of the input data is scaleable according to the bit length of the input data, different number of sequence units is required for operation. The function of determining which sequence units to be operated for convolution calculation is performed by the configurable connection unit. As mentioned above, the configurable connection unit is implemented by multiplexors or other hardware. With the configurable connection unit, input data with dynamic data ranges can be scaled and processed.

Booth decoders and coefficient registers

Being selected by the configurable connection unit, the selected sequence units are decoded by Booth decoders. The decoded sequence units are then multiplied by filter coefficients stored in coefficient registers to generate intermediate products for a convolution calculation. In the example of using radix-4 Booth algorithm, the five possible values c, −c, 2c, −2c, and 0 of the intermediate products are generated.

Path Control Unit

Figure 6:
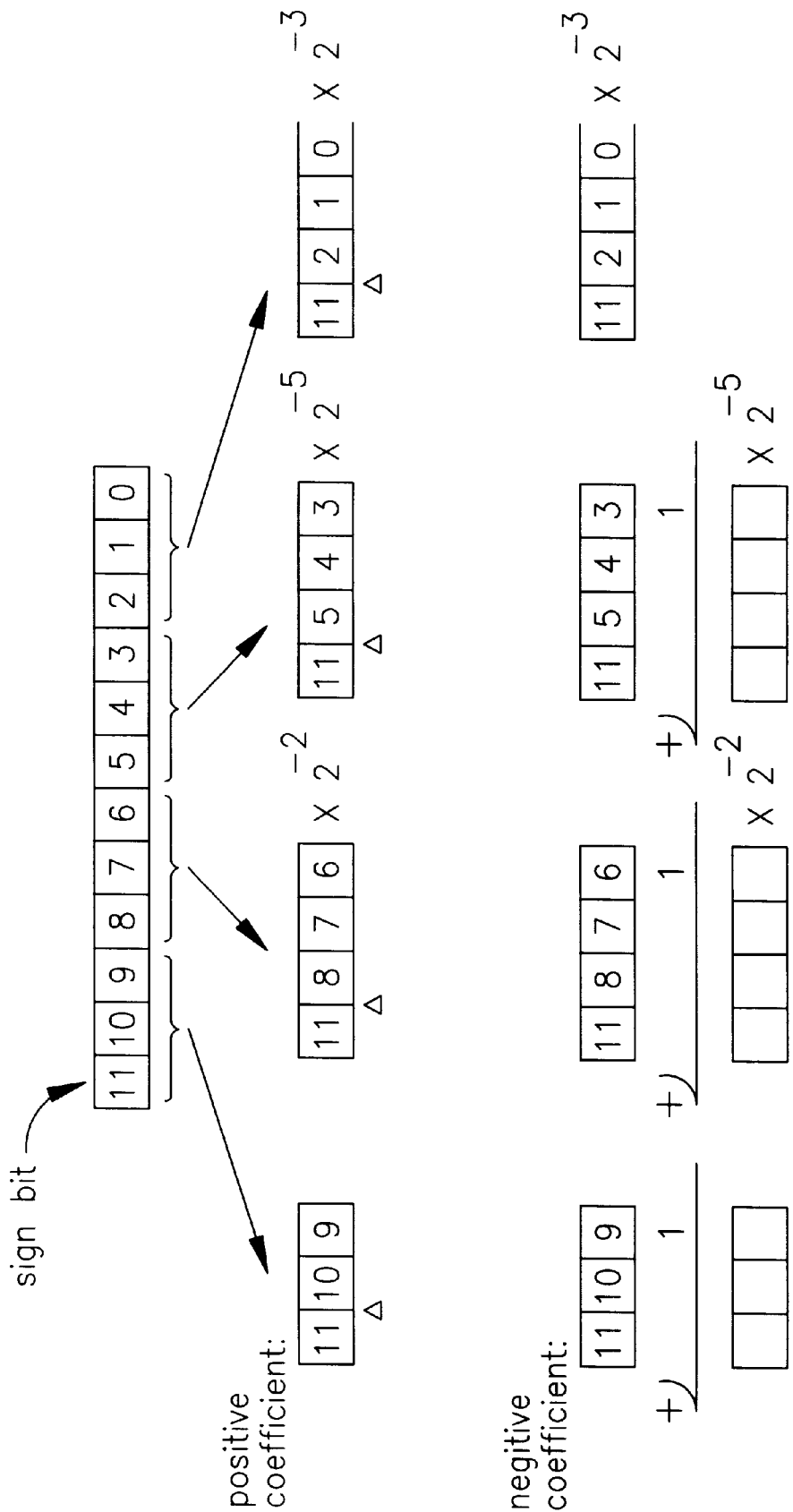
FIG. 6 shows the method of partitioning the coefficients applied to the FIR processor shown in FIG. 3.

The function of the path control unit is to select and scale the intermediate products for accumulation. For a single precision calculation, all of the intermediate products are required and selected for accumulation, whereas for a double precision calculation. the intermediate products have to be scaled and selected for accumulation calculation. In the case of M Booth decoders, that is, M taps, included in a processor, each of the taps performs the calculation of a C-bit datum. Assuming that the filter coefficient of the processor comprises D bits. If D is larger than C, two Booth decoders are required to accomplish the calculation of a filter coefficient. Since the filter coefficient has a sign bit, when the filter coefficient is partitioned into multiple C-bit partial coefficients, the partial coefficients have to be modified according to a practical condition. The method of partitioning the filter coefficient is shown as FIG. 6.

Figure 7:
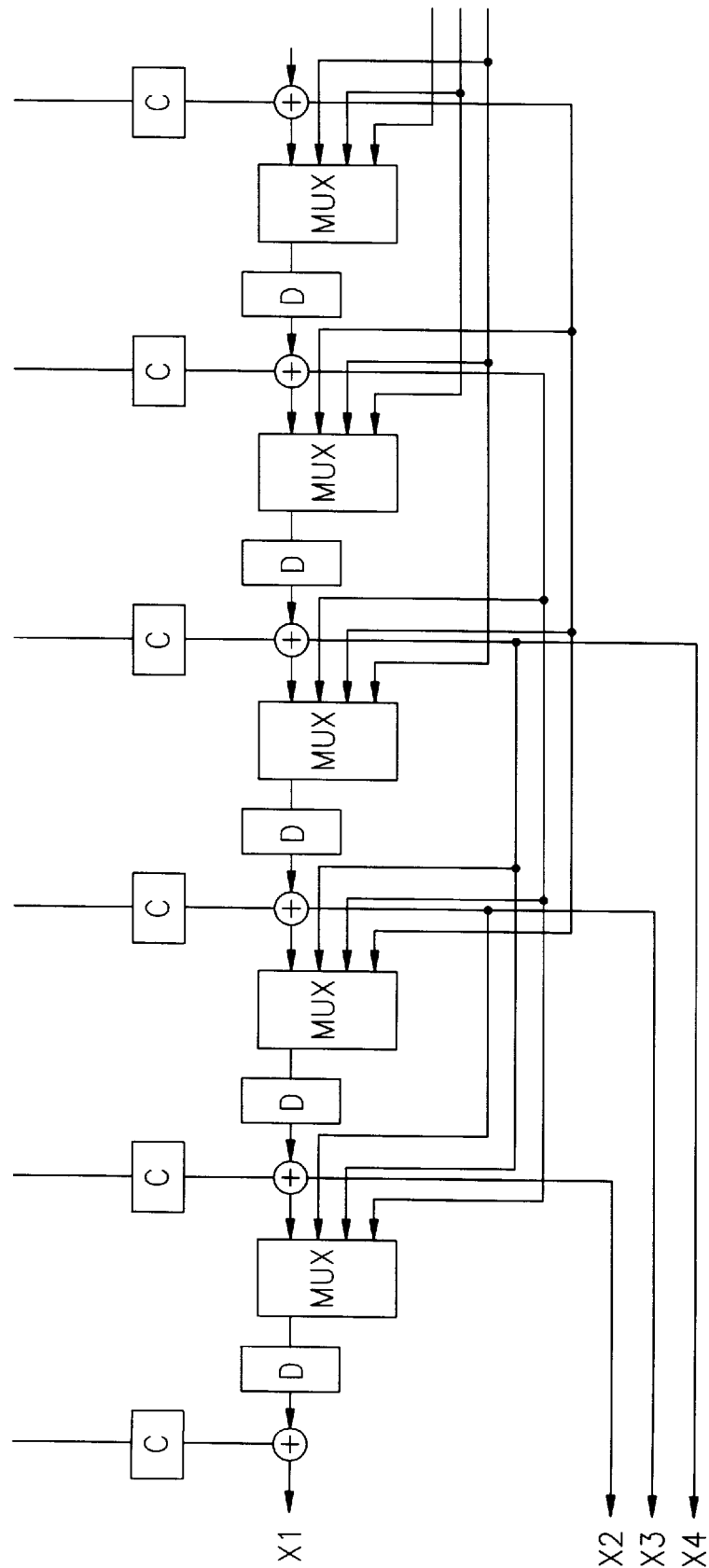
FIG. 7 shows the structure of the path control unit of the FIR processor shown in FIG. 3.

In the assumption mentioned above, the bit number of a filter coefficient is twice of the bit number of the data that the Booth decoder can process. Therefore, two Booth decoders are required for one filter coefficient to accomplish a multiplication calculation with an input datum. The calculation results thus comprise a high-bit datum and a low-bit datum. A complete tap calculation must include a combination of these two data. Since the FIR processor employs a pipeline structure, so that the calculation result of each tap has to be accumulated. The accumulation path is controlled and selected by the path control unit. An example of the path control unit shown in FIG. 7 can perform the calculation of a coefficient with a length of 4C. Since the length of the filter coefficient is scaleable, the intermediate products can be selected to accumulate. Thus, a scaleability of precision of the output data is obtained.

Post-processing Unit

Figure 8:
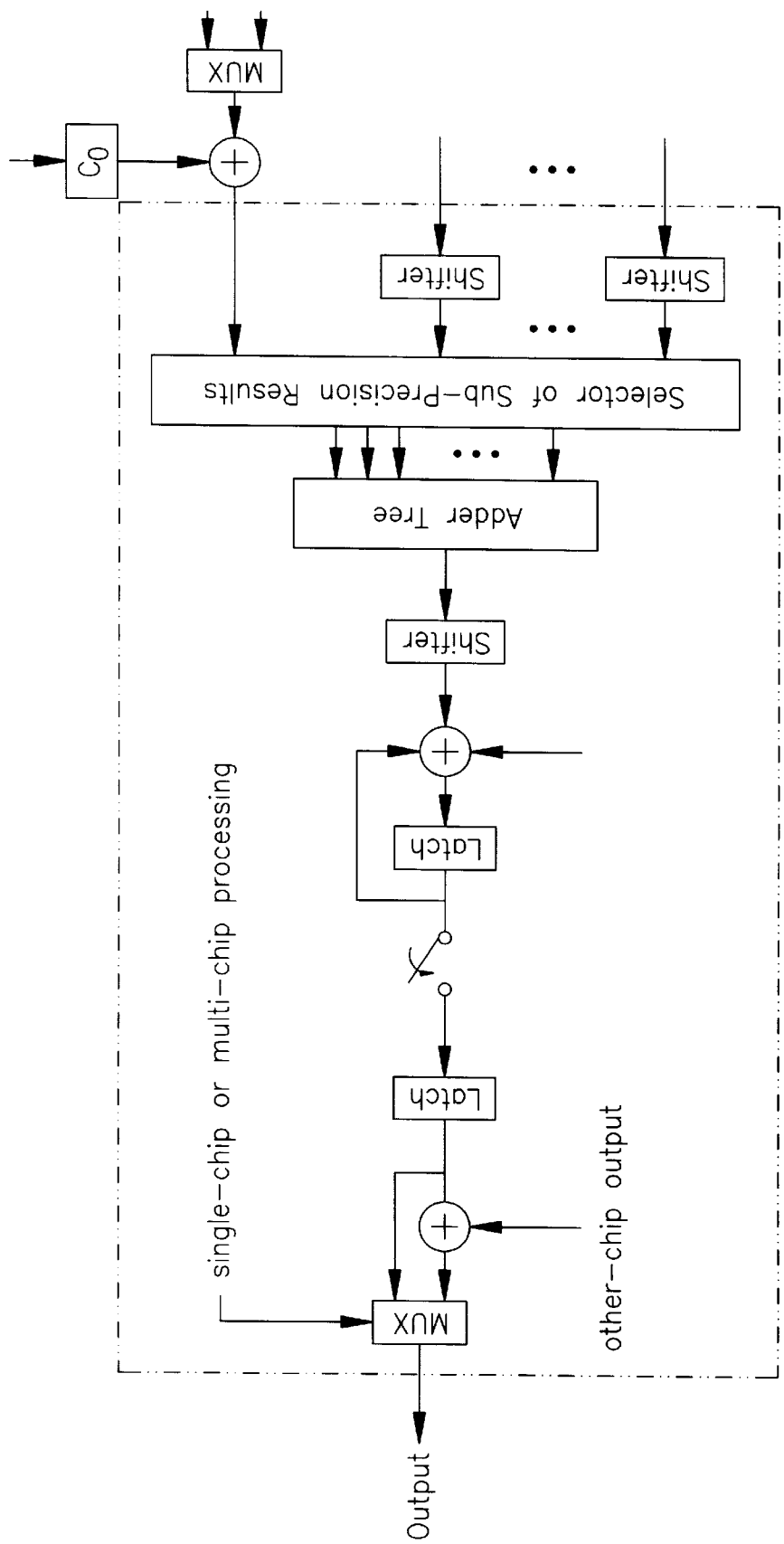
FIG. 8 shows the post-processing unit of the FIR processor shown in FIG. 3.

The post-processing unit performs accumulation for the intermediate products selected by the path control unit. The post-processing unit may be implemented by various forms of hardwares. As shown in FIG. 8, an example of the post-processing unit comprises at least adders, shifters, latches, and multiplexors for supporting various dynamic ranges of input data and filter coefficients. As mentioned above, the intermediate products for accumulation calculation are selected by the path control unit. The accumulation for intermediate products selected from the path control unit is performed by the post-processing unit. In the case that the filter coefficient has a bit number larger than the bit number that each tap can process, a combination of a low-bit datum and a high-bit datum is required for outputting a correct output signal, and the combination is accomplished by the post-processing unit. When the selected intermediate products are input into the post-processing unit from the path control unit, a bit-precision alignment is performed by shifters. According to a control signal, a precision selector, and an accumulator, these partial results are combined as a complete output. The output is represented as:

$$Y_n = \sum_{l=0}^{W/2-1} \sum_{j=0}^{S} \left[ \sum_{i=0}^{N-1} B(X_{n-i,1}, C_{i,j}) \times 2^{2l} \right] \times 2^{-(j \times k - 1)} \qquad (9)$$

wherein k represents the bit number of the partial filter coefficient.

For a FIR with dynamic ranges of 8 bits and 16 bits for input data and filter coefficients implemented by using the COMPASS 5V standard cell library in the TSMC 0.6 μm CMOS, operations of 64-tap 8-bit and 32-tap 16-bit can be operated. The specification of such a FIR processor is shown as Table 1. The power consumption of such a FIR processor with a die size of 8.0×8.0 mm$^2$ is about 2.9 W at a system clock of 100 MHz. The input/output throughput rate is 25 MHz for 8-bit data and 12.5 MHz for 16-bit data. Compared to a conventional Booth-algorithm 64-tap 8-bit FIR processor, the FIR processor in the invention takes around 6.5% increase of total gate count for scaleable operations. Therefore, the FIR architecture in the invention can be widely used for various dynamic ranges of input data and filter coefficients at a reasonable cost.

TABLE 1

| FIR Taps | 8-bit 64-tap, 16-bit 32 tap |
|---|---|
| Technology | TSMC 0.6 μm CMOS |
| Design Scheme | COMPASS standard cell library |
| Supply voltage | 5V |
| Clock rate | 100 MHz |
| Power consumption (Simulation) | 2.9W at 100 MHz |
| Die Size | 8.0 × 8.0 mm² |

Figure 9A:
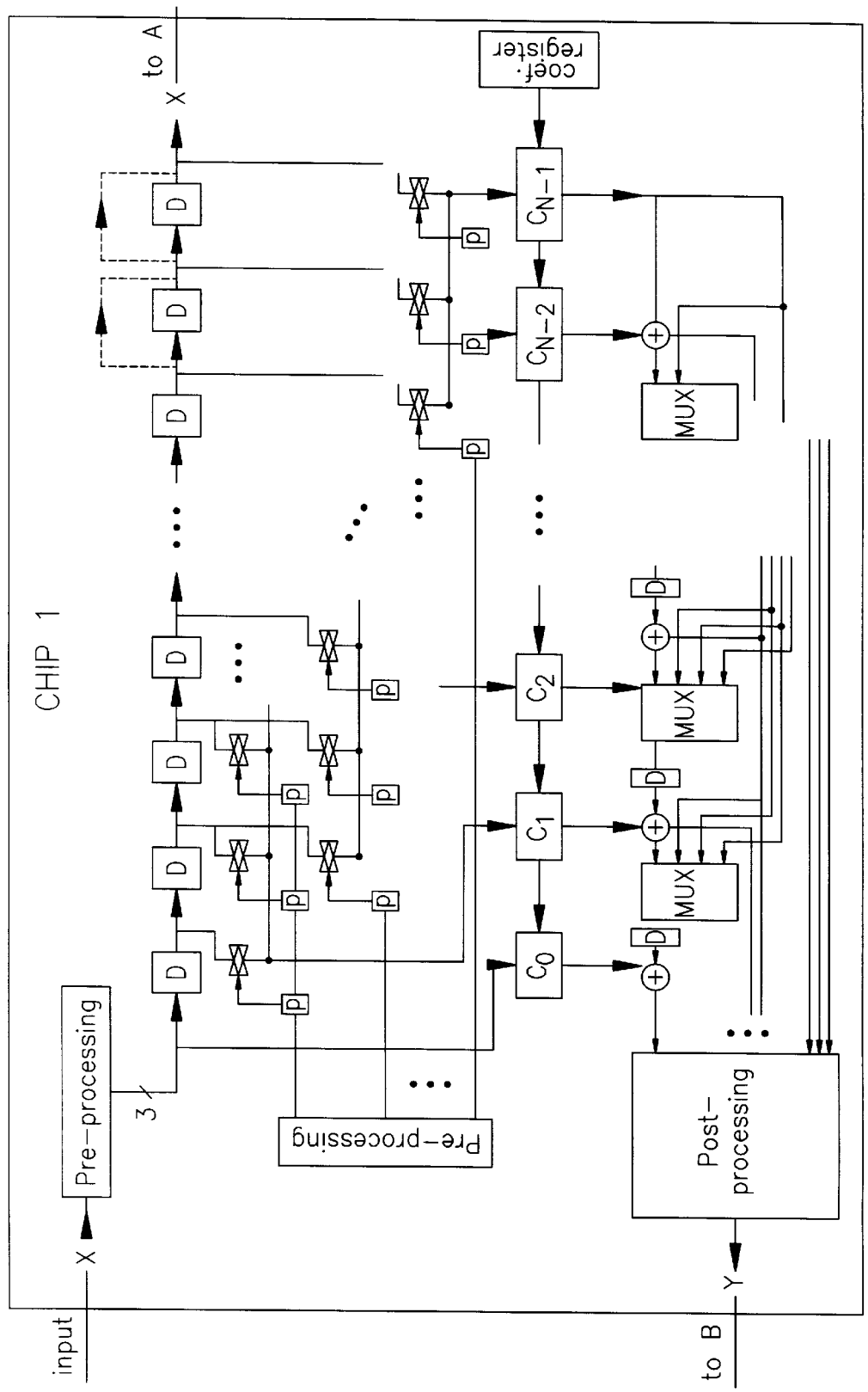
FIG. 9 shows the chip cascading structure of the FIR processors according to the invention.
Figure 9B:
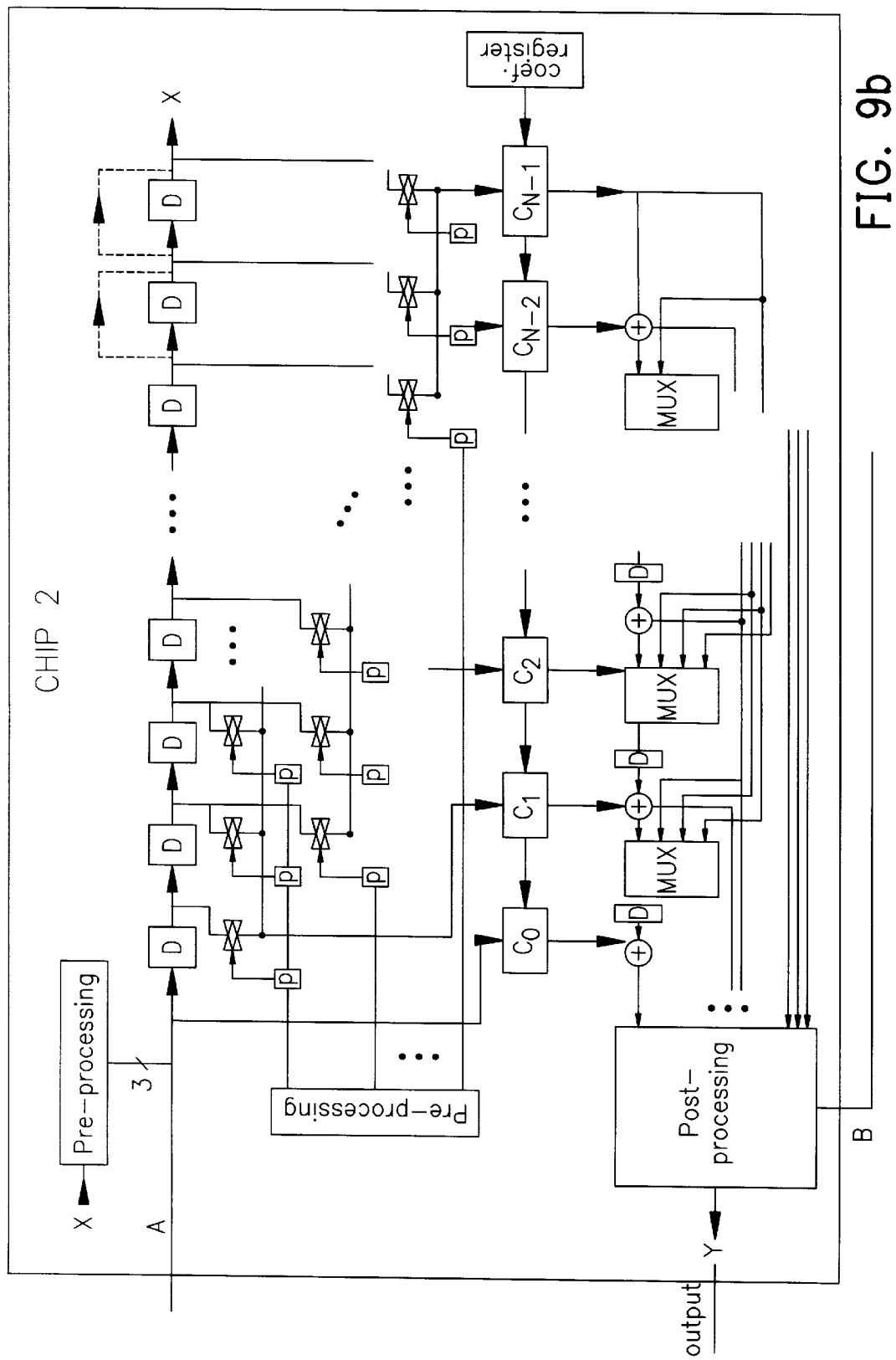

If the tap number of FIR cannot be realized in one chip, the last latch of input data is connected to the output pins for cascading next chip. However, the latches of input data may be not completely used due to the configurable connections for various dynamic data ranges. The bypass design can be utilized to get rid of the serial pipelined flow. The last datum for filter operation in the first chip can be easily transmitted to the input latch of the second chip without delay. On the other hand, the accumulated result in the first chip is also transmitted to the post-processing unit on the second chip. In such a design shown in FIG. 9, the chip cascading can be easily accomplished without additional off-chip logic functions.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A programmable finite impulse response processor, by which a convolution calculation between input data and filter coefficients is performed based on Booth algorithm, comprising:

a pre-processing unit, to partition the input data into a pipeline sequence which comprises a plurality of sequence units in a Booth format;

data latches, to store the pipeline sequence from the pre-processing unit;

a configurable connection unit, to determine which of the sequence units are selected for the convolution calculation, so that a dynamic data range is scaleable by the processor;

coefficient registers, to store the filter coefficients;

Booth decoders, to decode the selected sequence units, and thereafter, the decoded selected sequence units being multiplied by the filter coefficients to generate a plurality of intermediate products;

a path control unit, to select an accumulation path for the intermediate products to be accumulated; and a post-processing unit, to perform a final accumulation of selected intermediate products for the convolution calculation between the selected sequence units and the filter coefficients.

2. The processor according to claim 1, wherein the pre-processing unit comprises:

an input buffer, to store various dynamic ranges of the input data;

a data latch, to record the maximum value of a counter for a currently-used dynamic data range;

a comparator, to compare an output value of the counter with an output value of the data latch; and a ripple counter, to generate a control signal of a multiplexor for selecting the Booth-format data.

3. The processor according to claim 1, wherein the configurable connection unit comprises a plurality of multiplexors.

4. The processor according to claim 1, wherein the post-processing unit comprises:

a plurality of shifters, to perform a bit correction of the convolution results;

a plurality of adders, to accumulate convolution result after bit correction;

a plurality of latches, for cascading the other chip; and a plurality of multiplexors, to determine a path for output.Taiwan, R.O.C.

* * * * *